United States Patent
Nakamura

(10) Patent No.: US 6,278,492 B1
(45) Date of Patent: *Aug. 21, 2001

(54) METHOD AND APPARATUS FOR TRANSMITTING DIGITAL COLOR SIGNALS TO A CAMERA

(75) Inventor: Hitoshi Nakamura, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/804,746

(22) Filed: Feb. 21, 1997

(30) Foreign Application Priority Data

Feb. 22, 1996 (JP) .................................. 8-034810

(51) Int. Cl.[7] .................................. H04N 11/20
(52) U.S. Cl. .................................. 348/441; 348/262
(58) Field of Search .................................. 348/262, 263, 348/264, 265, 441, 453, 488

(56) References Cited

U.S. PATENT DOCUMENTS

| | | | |
|---|---|---|---|
| 4,345,270 | 8/1982 | Nagumo et al. | 348/266 |
| 4,677,464 * | 6/1987 | Yamaji et al. | 348/388 |
| 4,989,091 * | 1/1991 | Lucas | 348/458 |
| 5,095,364 * | 3/1992 | Asaide et al. | 348/264 |
| 5,444,492 * | 8/1995 | Kihara | 348/445 |
| 5,943,100 * | 8/1999 | Hildebrandt et al. | 348/453 |

FOREIGN PATENT DOCUMENTS

| | | |
|---|---|---|
| 0 520 759 A | 6/1992 | (EP) . |
| 0 592 005 A | 10/1993 | (EP) . |
| 0 618 739 A | 3/1994 | (EP) . |

* cited by examiner

Primary Examiner—Wendy R. Garber
Assistant Examiner—Jacqueline Wilson
(74) Attorney, Agent, or Firm—Frommer Lawrence & Haug, LLP.; William S. Frommer; Dexter T. Chang

(57) ABSTRACT

A method and apparatus for transmitting digital color imaging signals to a camera controlling unit at a pre-set sampling rate obtained on imaging using a CCD imaging device. The sampling rate of at least one of plural signal components making up the digital color imaging signals is converted so that the sampling rate will be higher than the pre-set sampling rate. The digital color imaging signals containing at least one signal component having the converted sampling rate are transmitted to the camera control unit.

19 Claims, 7 Drawing Sheets

METHOD AND APPARATUS FOR TRANSMITTING DIGITAL COLOR SIGNALS TO A CAMERA

BACKGROUND OF THE INVENTION

1. Field of the Invention

This invention relates to a method and apparatus for transmitting digital video signals obtained on imaging by a CCD imaging device.

2. Description of the Related Art

Up to now, there has been known a system in which, as a system for digitally transmitting digital color video signals obtained on imaging by a CCD imaging device, a portable television camera (camera head), and a camera control unit provided in a relaying car, editing room or an imaging room, are interconnected by a cable, such as a coaxial cable for digitally transmitting color image signals imaged by the camera head to the camera control unit.

In such digital transmission system for transmitting digital color video signals between the camera head and the camera control unit, the sampling rate is set so as to be the same as that for digital imaging signals outputted by the camera control unit, or as the sampling frequency (sampling rate) of a charge coupled device (CCD).

FIG. 1 shows an example for transmitting digital color imaging signals from the camera head to the camera control unit. The arrangement shown in FIG. 1 uses a so-called multiple CCD type CCD camera head for a camera head in which the CCDs are offset relative to one another for suppressing pseudo signals and improving the resolution. This technique is known as a pixel offsetting technique. While the imaging signals of the frequency not less than one-half the sampling frequency represent pseudo signals in the single CCD type CCD camera head, even the imaging signals of a frequency not less than one-half the sampling frequency cease to be pseudo signals in the multiple CCD type CCD camera head employing the pixel offsetting technique, thus realizing high resolution.

Referring to FIG. 1, the light from an object, incident on a lens system 201 of a camera head 200, is separated by a color separation prism 202 into light beams of three colors, namely red (R), green (G) and blue (B). The light beams of R, G and B are incident on solid-state imaging devices (CCDs) 203a, 203b and 203c for conversion into electrical signals corresponding to the R, G and B colors, respectively. For exploiting the technique of the pixel offsetting technique, the CCDs 203R, 203G and 203B are arranged so that the CCD 203R and the CCD 203B are horizontally offset relative to the CCD 203G by one-half the pixel pitch. Consequently, the image incident on the CCDs 203R, 203G and 203B has imaging signals for G complementally sampled with respect to the imaging signals for R and B.

The imaging signals for R, G and B from the CCDs 203R, 203G and 203B are amplified by associated pre-amplifiers 204R, 204G and 204B, respectively, so as to be then converted by analog/digital (A/D) converters 205R, 205G and 205B, respectively, into digital imaging signals. It is noted that the A/D converters 205R, 205G and 205B convert analog imaging signals into digital signals using clocks of the same frequency as the sampling clocks used in the CCDs 203R, 203G and 203B, while the A/D converter 205G for G perform digital conversion with clocks delayed in phase by 180° from those used in the A/D converters 205R and 205B for R and B, respectively, for realizing the pixel offsetting effect. In the example of FIG. 1, the frequency of the digital imaging signals outputted by the (A/D) converters 205R, 205G and 205B is 18 MHz.

The digital imaging signals outputted by the (A/D) converters 205R, 205G and 205B are sent to a digital processing circuit 206 which then performs so-called contour enhancement or gamma ($\gamma$) processing on the digital imaging signals supplied thereto. The present digital processing circuit 206 performs processing with the frequency twice the frequency of the CCD sampling clocks for maintaining the pixel offsetting effect. Thus the frequency of the digital imaging signals obtained on processing by the digital processing circuit 206 is twice the frequency of the input digital imaging signals (18 MHz), or 36 MHz.

If a format of so-called SMPTE (Society of Motion Picture and Television Engineers) 295M composite signals, for example, is used as a format for digital video signals handled between the camera head 200 and a control unit 210, the frequency of the digital imaging signals obtained by the digital processing circuit 206 (36 MHz) is converted into a rate of, for example, 13.5 MHz. To this end, the digital imaging signals obtained by the digital processing circuit 206 are sent to a frequency conversion circuit 207 for converting the signal with the rate of 36 MHz into a signals with a rate of 13.5 MHz. In the above example, the rate of 13.5 MHz is used, however, if the rate of 18 MHz which is the same as the sampling frequency of the imaging signal output of the CCD is used, the frequency of the digital imaging signals from the digital processing circuit 206 (36 MHz) is converted by the frequency conversion circuit 207 into the frequency of 18 MHz. Meanwhile, the SMPTE is the digital standard for composite signals, and the SMPTE 295M provides the digital encoding standard for the NTSC signals and the bit-serial interfacing standard. The SMPTE provides for two sorts of the sampling frequency, that is 13.5 MHz and 18 MHz, according to Recommendations 601. The latter frequency of 18 MHz is a frequency raised from 13.5 MHz in proportion to the increased aspect ratio (13.5 4/3).

The R, G and B component signals, rate-converted by the frequency conversion circuit 207, are converted by a parallel/serial conversion circuit (P/S conversion circuit) 208 into composite signals of the above-mentioned SMPTE 295M standard so as to be outputted along with various other sorts of the information at an output terminal 209.

The composite digital imaging signals, outputted at the output terminal 209, are supplied to an input terminal 211 of the camera control unit 210 via a cable along with the other information.

The composite digital imaging signals, supplied to the camera control unit 210, are converted by a serial/parallel conversion circuit (S/P conversion circuit) 212 into component digital imaging signals of R, G and B. These component digital imaging signals of R, G and B are converted into analog imaging signals by digital/analog (D/A) converting circuits 213R, 213G and 213B associated with R, G and B, respectively, so as to be outputted at output terminals 214R, 214G and 214B, similarly associated with R, G and B, respectively.

If the composite digital video signals of the above-mentioned SMPTE 295M standard are outputted by the camera control unit 210, the R, G and B component digital video signals from the S/P conversion circuit 212 are converted by the P/S conversion circuit 216 into composite signals of the above-mentioned SMPTE 295M standard which are outputted at an output terminal 217. Meanwhile, if the rate of the component digital video signals of R, G and B from the S/P conversion circuit 212 S, for example, 18

MHz, it is converted by a frequency converter 215 into the rate of 13.5 MHz and thence supplied to the P/S conversion circuit 216.

However, in the above-described system, there is raised no particular problem if the camera control unit 210 outputs only the above-mentioned digital video signals. However, if the camera control unit 210 outputs an analog video signal, the effect of pixel offsetting by the camera head 200 is annulled as concerns the resolution. Stated differently, if the sampling frequency of transmission from the camera head 200 to the camera control unit 210 is the above-mentioned frequency, the pixel offsetting in raising the resolution of the analog video signals obtained by the camera control unit 210 is not effective for the analog video signals obtained from the camera control unit 210. More specifically, the limit resolution obtained from the 36 MHz rate digital video signals obtained with the digital processing circuit 206 of the camera head 200 is ideally approximately 1400. However, only video signals with the resolution of approximately 540 or approximately 720 can be obtained from the digital video signals of, for example, the rate of 13.5 MHz or the rate of 18 MHz, obtained after transmission from the camera head 200 to the camera control unit 210, as in the system shown in FIG. 1, respectively, thus lowering the resolution.

SUMMARY OF THE INVENTION

It is therefore a principal object of the present invention to provide a method and apparatus for transmitting digital color video signals whereby video signals imaged by a CCD imaging device and outputted will be transmitted to a camera control unit without lowering the resolution for outputting high-resolution video signals from the camera control unit.

In one aspect, the present invention provides a method for transmitting digital color imaging signals to a camera controlling unit at a pre-set sampling rate obtained on imaging using a CCD imaging device. The transmission method of the present invention includes the steps of converting the sampling rate of at least one of plural signal components making up the digital color imaging signals so that the sampling rate will be higher than the pre-set sampling rate, and transmitting the digital color imaging signals containing at least the above-mentioned one signal component having the converted sampling rate.

In another aspect, the present invention provides an apparatus for transmitting digital color imaging signals to a camera controlling unit at a pre-set sampling rate obtained on imaging using a CCD imaging device. The transmission apparatus of the present invention includes means for converting the sampling rate of at least one of plural signal components making up the digital color imaging signals so that the sampling rate will be higher than the pre-set sampling rate, parallel/serial conversion means for converting the digital color imaging signals containing the above-mentioned at least one signal component having the converted sampling rate into serial color imaging signals, serial/parallel conversion means provided within the camera control unit for receiving the transmitted serial digital color imaging signals for converting the transmitted serial digital color imaging signals into parallel digital color imaging signals, and digital/analog converting means for converting the parallel digital color imaging signals converted by the serial/parallel conversion means into analog color imaging signals.

DESCRIPTION OF THE PREFERRED EMBODIMENTS

Figure 1:
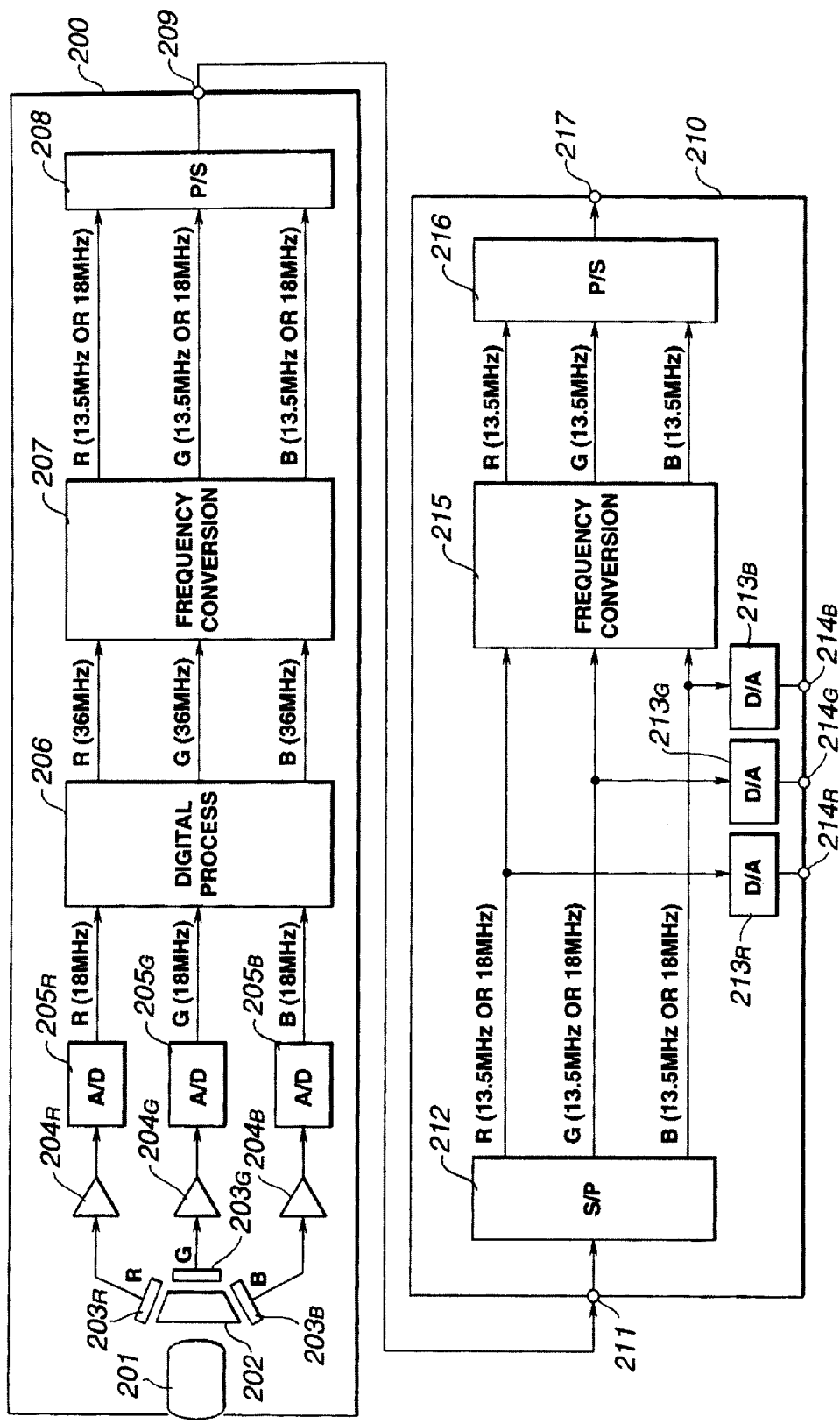
FIG. 1 is a block diagram showing an example of a transmission apparatus for digital color video signals.

Referring to the drawings, preferred embodiments of the present invention will be explained in detail.

Figure 2:
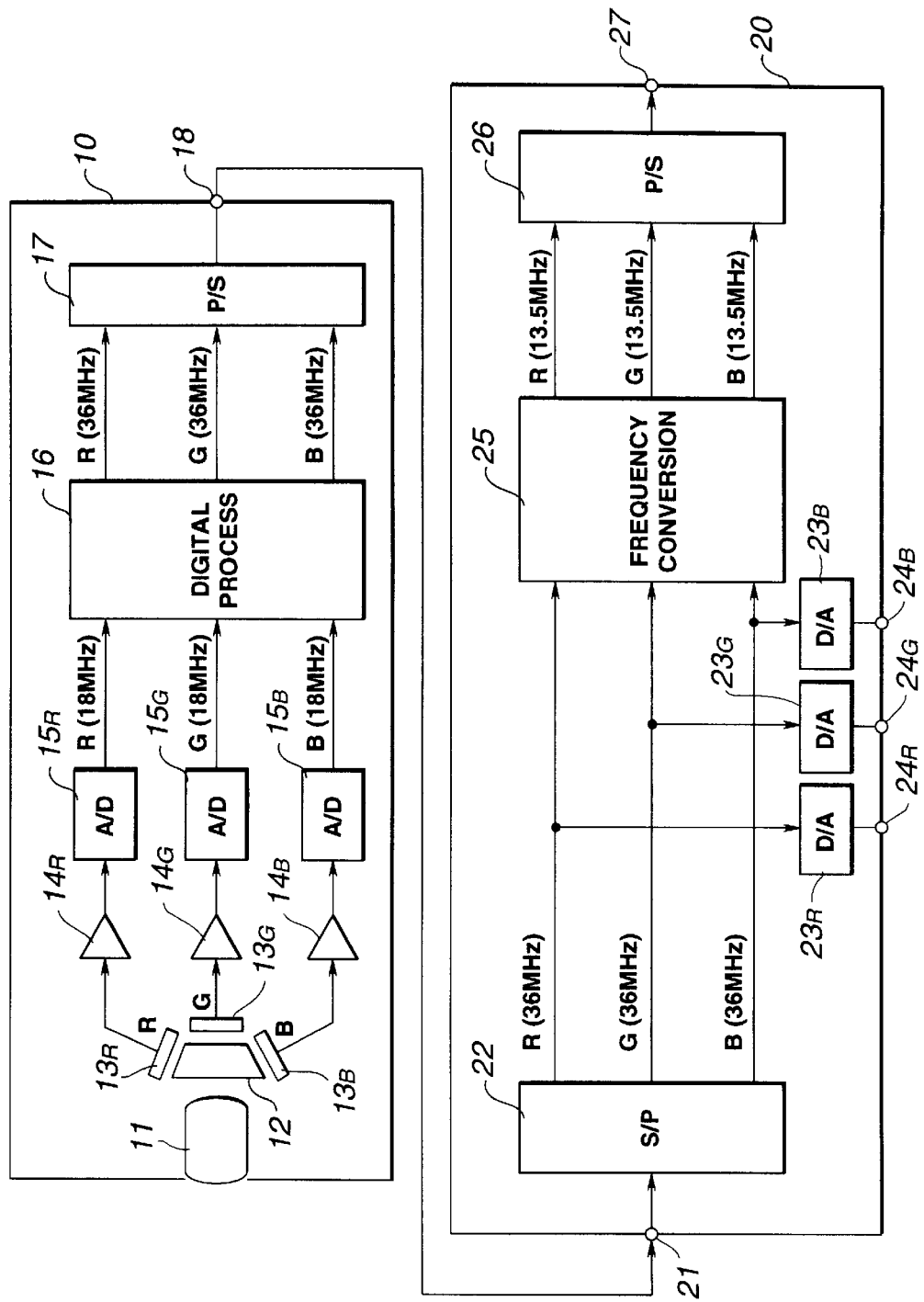
FIG. 2 is a block diagram showing an embodiment of a transmission apparatus for digital color imaging signals according to the present invention.

FIG. 2 illustrates a digital transmission system of a first embodiment of the present invention.

Referring to FIG. 2, the light from an object, incident on a lens system 11 of a camera head 10, is sent to a color-separation prism 12. The lens system 11 includes, in addition to a lens for imaging the light from the object on a CCD, a light stop unit for light volume adjustment or setting the depth of field and a lens driving mechanism for focusing. The lens system 11 may additionally include an IR cut filter or a UV cut filter, if so desired. The color-separation filter 12 is comprised of, for example, a dichroic prism, and separates the incident light on the lens 11 into red (R), green (G) and blue (B) beams, which are conducted towards CCDs 13R, 13G and 13B for R, G and B, respectively.

These R, G and B light beams are converted by the associated CCDs 13R, 13G and 13B into imaging signals associated with R, G and B, respectively. In the camera head 10 shown in FIG. 2, the CCDs 13R, 13G and 13B are arranged so that the CCDs 13R and 13B for R and B are horizontally offset by one-half the pixel pitch with respect to the CCD 13G for G. Consequently, the images incident on the CCDs 13R, 13G and 13B have the imaging signals for G complementally sampled with respect to the imaging signals for R and B.

The imaging signals for R, G and B from the CCDs 13R, 13G and 13B are amplified by associated pre-amplifiers 14R, 14G and 14B, respectively, and subsequently converted into digital imaging signals by analog/digital (A/D) conversion circuits 15R, 15G and 15B, respectively. The A/D conversion circuits 15R, 15G and 15B digitally convert the analog imaging signals, using the clocks of the same frequency as that of the sampling clocks in the CCDs 13R, 13G and 13B. In the A/D conversion circuit 15G for G, digital conversion is performed with clocks delayed in phase by 180° from the A/D conversion circuits 15R and 15B for producing the pixel offsetting effect. In the embodiment of FIG. 2, the frequency of the digital imaging signals outputted by the A/D conversion circuits 15R, 15G and 15B is 18 MHz.

The digital imaging signals, outputted by the A/D conversion circuits 15R, 15G and 15B, are sent to a digital processing circuit 16, which then processes the digital imaging signals supplied thereto with digital signal processing, such as so-called contour enhancement, gamma (γ) processing, white balance adjustment, white clipping or knee processing. In the contour enhancement, contour enhancement signals for extracting the contour in the horizontal and vertical directions for enhancing the contour are generated for adding the contour enhancement signals to the original imaging signals for improving sharpness for eking out insufficient characteristics of the high-frequency components of the spatial frequency of the optical system or the imaging system. In addition, the digital processing circuit 16 performs the processing with a frequency twice the frequency of the sampling clocks of the CCD for maintaining the pixel offsetting effect. Therefore, the frequency of the digital video signals obtained by processing by the digital processing circuit 16 is twice the frequency (18 MHz) of the input digital imaging signals, or 36 MHz.

The above-mentioned R, G and B component digital video signals, obtained by the digital processing circuit 16, are converted by a P/S conversion circuit 17 into serial composite digital video signals which are outputted along with various other sorts of the information at an output terminal 18. Although no particular reference is made to the format of the serial digital video signals outputted at the output terminal 18, compatibility in format is maintained between the camera head 10 and the camera control unit.

The serial digital video signals outputted at the output terminal 18 are sent via a cable or the like to an input terminal 21 of the camera control unit 20.

The serial digital video signals of R, G and B, supplied to the camera control unit 20, are converted by an S/P conversion circuit 22 into R, G and B component digital video signals. These digital video signals of R, G and B are converted by D/A conversion circuits 23R, 23G and 23B associated with R, G and B, respectively, into analog video signals, which are outputted at output terminals 24R, 24G and 24B similarly associated with R, G and B, respectively.

When the above-mentioned SMPTE 295M standard composite digital video signals are outputted from the camera control unit 20, the R, G and B component digital video signals from the S/P conversion circuit 22 are converted by a frequency conversion circuit 25 to a rate of, for example, 13.5 MHz, before being sent to a P/S conversion circuit 26. The digital video signals, converted by the P/S conversion circuit 26 into the SMPTE 295M standard composite digital video signals, are outputted at an output terminal 27.

In the above-described first embodiment, the limit resolution obtained from the 36 MHz rate digital video signals obtained with the digital processing circuit 206 of the camera head 200 is ideally approximately 1400. This rate is maintained when the digital video signals are transmitted to the camera control unit 20. Therefore, the R, G and B component digital video signals outputted at the output terminals 24R, 24G and 24B of the camera control unit 20 are of the above-mentioned resolution. That is, since the digital video signals are transmitted to the camera control unit 20 in the present first embodiment at a rate twice the CCD sampling clocks, it becomes possible to output video signals of high resolution obtained by pixel offsetting from the camera control unit 20. For taking advantage of the effect of the pixel offsetting in the camera head on improving the resolution, it suffices if the frequency of the camera head output is set so as to be higher than the CCD sampling frequency, as in the first embodiment described above. However, for simplifying the processing, it is desirable to set the rate of the video signals outputted by the camera head so as to assure facilitated conversion by the camera control unit. For example, if the camera control unit outputs the SMPTE 295M standard composite digital video signals with the frequency of 13.5 MHz, it is desirable that the rate of the video signals outputted by the camera head be an integer number of times 13.5 MHz obtained on conversion by the camera control unit. Specifically, with the sampling frequency of the CCD of the camera head of 18 MHz, the rate of the video signals outputted by the camera head is desirably higher than 18 MHz and equal to an integer number times, such as two times of 13.5 MHz, or 27 MHz.

Figure 3:
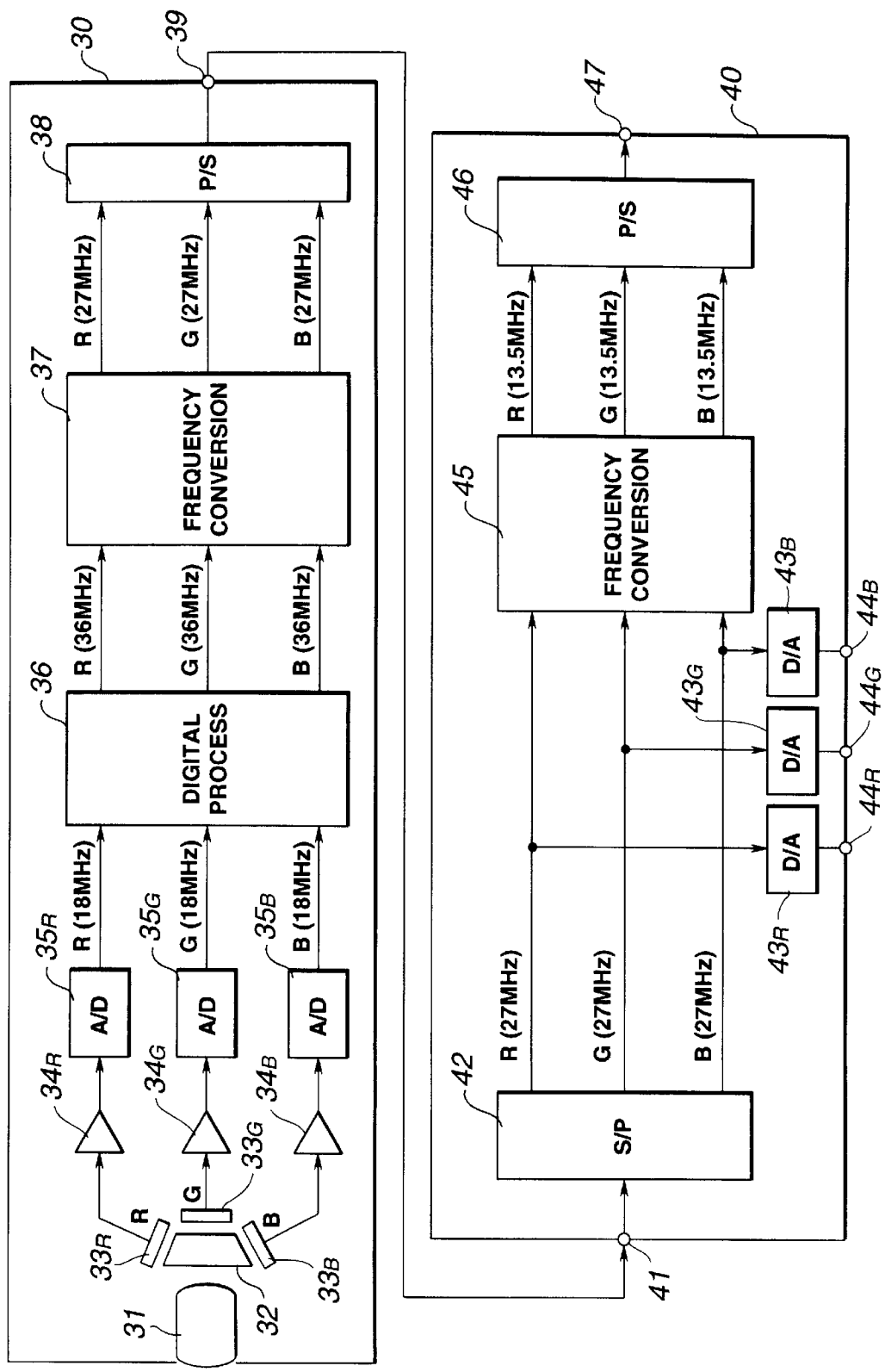
FIG. 3 is a block diagram showing another embodiment of a transmission apparatus for digital color imaging signals according to the present invention.

FIG. 3 shows a second embodiment for this case of the present invention. In FIG. 3, the structure from a lens system 31 of a camera head 30 to a digital processing circuit 36 is the same as that from the lens system 11 of the camera head 10 up to the digital processing circuit 16 of FIG. 2.

Referring to FIG. 3, the light from an object, incident on the lens system 31 of the camera head 30, is separated by a color-separating prism 32 into R, G and B beams, which are conducted towards a CCD 33R for R, a CCD 33G for G and a CCD 33B for B, respectively. These R, G and B beams are converted by the associated CCD 33R, CCD 33G and CCD 33B into imaging beams associated with R, G and B, respectively, and amplified by associated pre-amplifiers 34R, 34G and 34B so as to be supplied to A/D converters 35R, 35G and 35B, respectively. The imaging signals, converted into digital signals by the A/D converters 35R, 35G and 35B, are processed by a digital processing circuit 36. The frequency of the digital imaging signals, obtained on processing by the digital processing circuit 36, is twice the frequency of the input digital imaging signals (18 MHz), or 36 MHz.

The above-mentioned R, G and B component digital signals, obtained by the digital processing circuit 36, are converted to the rate of 27 MHz by the frequency converter 37 and thence supplied to a P/S converter 38. The P/S converter 38 converts the R, G and B component digital signals from the frequency converter 37 into serial digital video signals which are then outputted along with other various sorts of the information at an output terminal 39. Although no particular reference is made to the format of the serial digital video signals outputted at the output terminal 39, compatibility in format is maintained between the camera head 30 and the camera control unit 40.

The serial digital video signals outputted at the output terminal 39 are sent via a cable or the like to an input terminal 41 of the camera control unit 40.

The serial digital video signals of R, G and B, supplied to the camera control unit 40, are converted by an S/P conversion circuit 42 into R, G and B component digital video signals. These digital video signals of R, G and B are converted by D/A conversion circuits 43R, 43G and 43B associated with R, G and B, respectively, into analog video signals, which are outputted at output terminals 44R, 44G and 44B similarly associated with R, G and B, respectively.

When the above-mentioned SMPTE 295M standard composite digital video signals are outputted from the camera control unit 40, the R, G and B component digital video signals from the S/P conversion circuit 42 are converted by a frequency conversion circuit 45 to a rate of, for example, 13.5 MHz, before being sent to a P/S conversion circuit 46. The digital video signals, converted by the P/S conversion circuit 46 into the SMPTE 295M standard composite digital video signals, are outputted at an output terminal 47.

In the above-described second embodiment, since the sampling rate of the digital video signals transmitted from the camera head 30 to the camera control unit 40 is 27 MHz, the R, G and B component video signals, outputted by output terminals 44R, 44G and 44B of the camera control unit 40, are of a limit resolution exceeding 1000. That is, it becomes similarly possible with the present second embodiment to output video signals of high resolution from the camera control unit 40. In addition, since the digital video signals of a rate that permits facilitated conversion by the camera control unit 40 are outputted by the camera head 30, rate conversion by the camera control unit 40 is facilitated.

As a third embodiment of the present invention, an arrangement of reducing the amount of bits transmitted between the camera head and the camera control unit is explained.

If, in signal transmission between the camera head and the camera control unit, 10 bits each of the R, G and B digital signals are transmitted at a sampling rate of 27 MHz, the transmission channel of at least 810 Mbits/sec, inclusive of the signalless portion, is required in the absence of data compression. Thus, if a system in which the R, G and B digital signals of 10 bits each are transmitted at a sampling rate of 13.5 MHz and, in addition, the high-resolution luminance signals Y of 10 bits are transmitted at a sampling rate of 27 MHz/sec, a transmission channel of 675 Mbits/sec suffices for digital video signals in the signal transmission between the camera head and the camera control unit.

Figure 4:
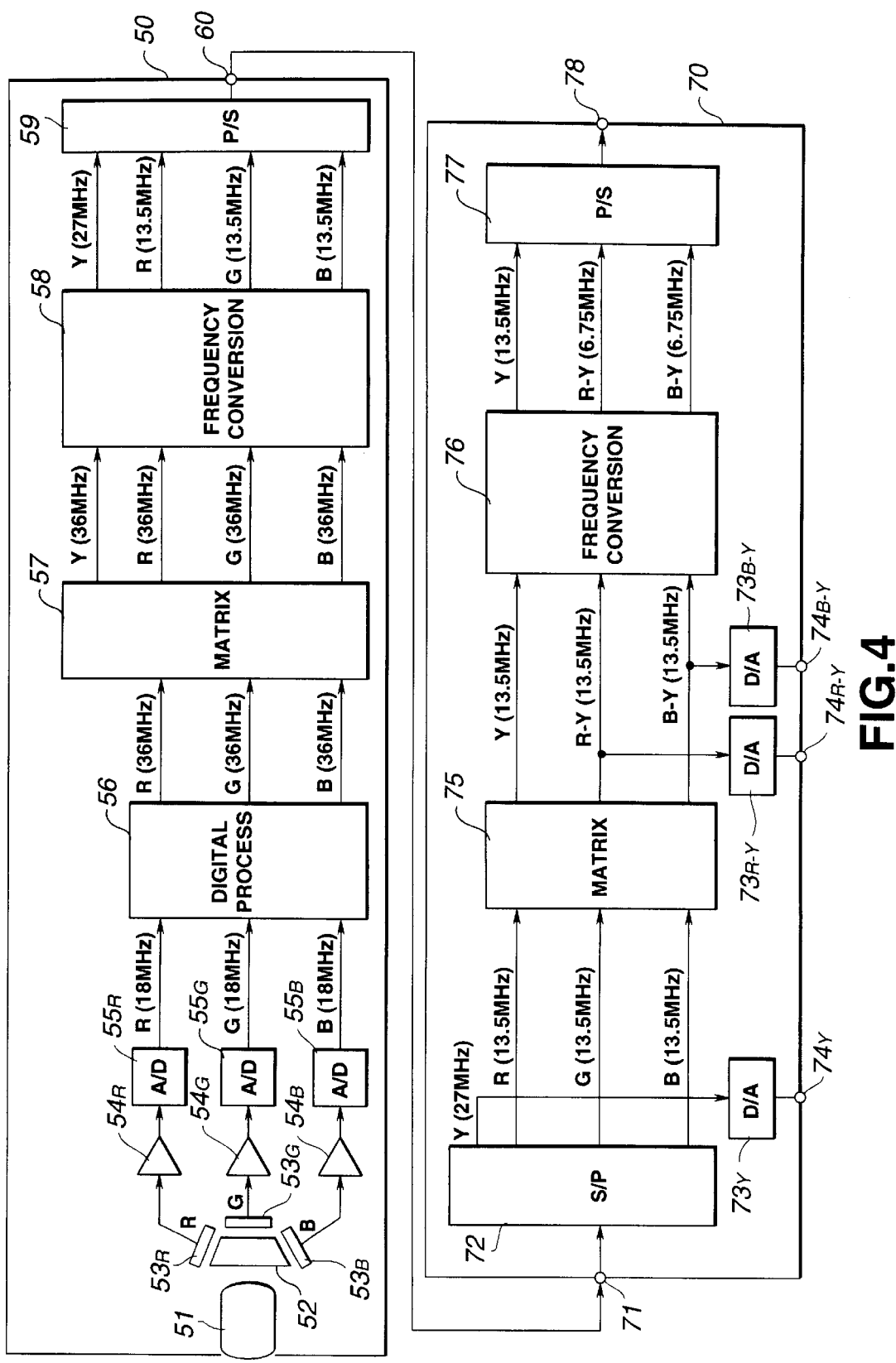
FIG. 4 is a block diagram showing a further embodiment of a transmission apparatus for digital color imaging signals according to the present invention.

FIG. 4 shows a third embodiment for this case of the present invention. In FIG. 4, the structure from a lens system 51 of a camera head 50 to a digital processing circuit 56 is the same as that from the lens system 11 of the camera head 10 up to the digital processing circuit 16 of FIG. 1.

Referring to FIG. 4, the light from an object, incident on the lens system 51 of the camera head 50, is separated by a color-separating prism 52 into R, G and B beams, which are conducted towards a CCD 53R for R, a CCD 53G for G and a CCD 53B for B, respectively. These R, G and B beams are converted by the associated CCD 53R, CCD 53G and CCD 53B into imaging beams associated with R, G and B, respectively, and amplified by associated pre-amplifiers 54R, 54G and 54B so as to be supplied to A/D converters 55R, 55G and 55B, respectively. The imaging signals, converted into digital signals by the A/D converters 55R, 55G and 55B, are processed by a digital processing circuit 56. The frequency of the digital imaging signals, obtained on processing by the digital processing circuit 56, is twice the frequency of the input digital imaging signals (18 MHz), or 36 MHz.

The above-mentioned R, G and B component digital signals, obtained by the digital processing circuit 56, are sent to a matrix circuit 57. The matrix circuit 57 generates a digital luminance signal Y from the above-mentioned R, G and B digital signals and outputs the generated luminance signal. In addition, the matrix circuit 57 outputs the R, G and B digital signals. The signal rates of the digital luminance signal Y and the R, G and B digital signals are each 36 MHz.

The digital luminance signal Y and the R, G and B digital signals, outputted from the matrix circuit 57, are sent to a frequency conversion circuit 58. This frequency conversion circuit 58 converts the signal rate of the luminance signal Y and that of the R, G and B digital signals to 27 MHz and 13.5 MHz, respectively.

The signals converted in signal rate by the frequency conversion circuit 58 are sent to a P/S conversion circuit 59. The P/S conversion circuit 59 converts the digital luminance signal Y and the R, G and B digital signals into serial digital signals which are outputted at an output terminal 60 along with various other sorts of the information. Although no particular reference is made to the format of the serial digital video signals outputted at the output terminal 60, compatibility in format is maintained between the camera head 50 and the camera control unit 70.

The serial digital video signals outputted at the output terminal 60 are sent via a cable or the like to an input terminal 71 of the camera control unit 70.

The serial digital video signals of R, G and B, supplied to the camera control unit 70, are converted by an S/P conversion circuit 72 into R, G and B component digital video signals. Meanwhile, the signal rate of the digital luminance signal Y outputted by the S/P conversion circuit 72 is 27 MHz, while that of the digital video signals for R, G and B is 13.5 MHz. The digital luminance signal Y, having the signal rate of 27 MHz, is converted by a D/A converter 73Y into analog luminance signal which is outputted at an output terminal 74Y.

The digital video signals of R, G and B from the S/P conversion circuit 72 may be converted into analog signals and outputted from the camera control unit 70 as in the second embodiment described above. However, in the present third embodiment, digital color difference signals R-Y and B-Y are generated from the digital video signals of R, G and B from the S/P conversion circuit 72 and converted into analog signals, which are outputted.

The digital video signals for R, G and B, with the signal rate of 13.5 MHz, outputted by the S/P conversion circuit 72, are sent to a matrix circuit 75, which then generates the digital luminance signal Y and the digital color difference signals R-Y and B-Y from the digital video signals of R, G and B from the S/P conversion circuit 72 and outputs the generated color difference signals. The signal rates of the digital luminance signal Y and the digital color difference signals R-Y and B-Y, formed by the matrix circuit 75, are each 13.5 MHz.

Of the signals formed by the matrix circuit 75, the digital color difference signals R-Y and B-Y are converted by associated D/A conversion circuits 73R-Y and 73B-Y into analog signals which are outputted at associated output terminals 74R-Y and 74B-Y.

It is similarly possible with the camera control unit 70 of the present third embodiment to convert composite digital video signals composed of the digital luminance signal Y and the digital color difference signals R-Y and B-Y from the matrix circuit 75 into composite digital video signals which are outputted.

To this end, the digital luminance signal Y and the digital color difference signals R-Y and B-Y from the matrix circuit 75 are sent to a frequency conversion circuit 76. The frequency conversion circuit 76 directly outputs the luminance signal Y at the rate of 13.5 MHz, while outputting the digital color difference signals R-Y and B-Y after rate conversion to 6.75 MHz.

The signals outputted by the frequency conversion circuit 76 are sent to a P/S conversion circuit 77. The P/S conversion circuit 77 converts the signals supplied from the frequency conversion circuit 76 into serial digital signals which are outputted at an output terminal 78.

In the above-described third embodiment, the transmission channel may be diminished because the luminance signal Y and the digital signals for R, G and B, transmitted from the camera head 50 to the camera control unit 70, are transmitted at a rate of 27 MHz and at a rate of 13.5 MHz, respectively. Since the luminance signal Y is transmitted at the rate of 27 MHz, high-resolution video signals can be produced. Since the rate of the luminance signal Y transmitted from the camera head 50 is set at 27 MHz that can be converted easily by the camera control unit 70, rate conversion by the camera control unit 70 is facilitated.

If the luminance signal Y is transmitted from the camera head along with the R, G and B signals as in the above-described third embodiment, ii becomes possible for the camera head to perform on/off switching control of outputting of the luminance signal Y. By so doing, if the luminance signal Y is not needed or cannot be used by the camera control unit, the luminance signal Y may be designed so as not be transmitted from the camera head. On the other hand, if the luminance signal Y can be used or is needed by the camera control unit, the luminance signal Y can be transmitted from the camera head. This raises the interchangeability between the camera head and the camera control unit such that superfluous circuitry can be dispensed with if high resolution is not required.

In the above-described first to third embodiments, the R, G and B digital signals are transmitted between the camera head and the camera control unit. However, it is also possible to transmit the luminance signal Y and the color difference signals R-Y and B-Y, as in a fourth embodiment now explained by referring to FIG. 5.

Figure 5:
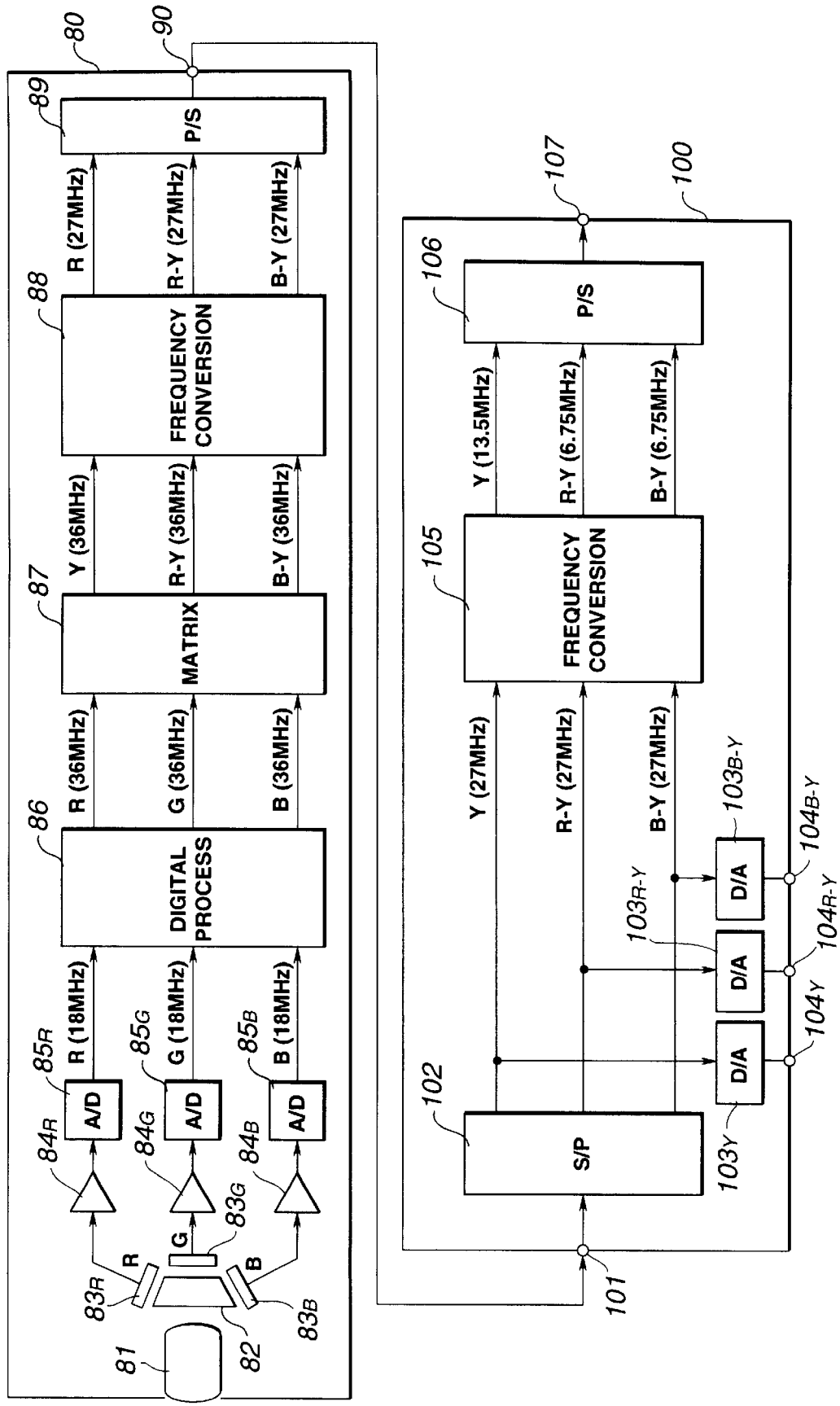
FIG. 5 is a block diagram showing a further embodiment of a transmission apparatus for digital color imaging signals according to the present invention.

In FIG. 5, the structure from a lens system 81 of a camera head 80 to a digital processing circuit 86 is the same as that from the lens system 11 of the camera head 10 up to the digital processing circuit 16 of FIG. 1.

Referring to FIG. 5, the light from an object, incident on the lens system 81 of the camera head 80, is separated by a color-separating prism 82 into R, G and B beams, which are conducted towards a CCD 83R for R, a CCD 83G for G and a CCD 83B for B, respectively. These R, G and B beams are converted by the associated CCD 83R, CCD 83G and CCD 83B into imaging beams associated with R, G and B, respectively, and amplified by associated pre-amplifiers 84R, 84G and 84B so as to be supplied to A/D converters 85R, 85G and 85B, respectively. The imaging signals, converted into digital signals by the A/D converters 85R, 85G and 85B, are processed by a digital processing circuit 86. The frequency of the digital imaging signals, obtained on processing by the digital processing circuit 86, is twice the frequency of the input digital imaging signals (18 MHz), or 36 MHz.

The above-mentioned R, G and B component digital signals, obtained by the digital processing circuit 86, are sent to a matrix circuit 87. The matrix circuit 87 generates a digital luminance signal Y and the color difference signals R-Y and B-Y from the above-mentioned R, G and B digital signals and outputs the signals. The signal rates of the digital luminance signal Y and the color difference signals R-Y and B-Y are each 36 MHz.

The digital luminance signal Y and the color difference signals R-Y and B-Y, outputted from the matrix circuit 87, are sent to a frequency conversion circuit 88. This frequency conversion circuit 88 converts the signal rate of the luminance signal Y and that of the color difference signals R-Y and B-Y to 27 MHz.

The signals converted in signal rate by the frequency conversion circuit 88 are sent to a P/S conversion circuit 89. The P/S conversion circuit 89 converts the digital luminance signal Y and the color difference signals R-Y and B-Y into serial digital signals which are outputted at an output terminal 90 along with various other sorts of the information. Although no particular reference is made to the format of the serial digital video signals outputted at the output terminal 90, compatibility in format is maintained between the camera head 80 and a camera control unit 100.

The serial digital video signals outputted at the output terminal 90 are sent via a cable or the like to an input terminal 101 of the camera control unit 100.

The serial digital video signals, supplied to the camera control unit 100, are converted by an S/P conversion circuit 102 into digital luminance signal Y and the color difference signals R-Y and B-Y. Meanwhile, the signal rate of the signals outputted by the S/P conversion circuit 102 is 27 MHz. These digital luminance signal Y and the color difference signals R-Y and B-Y are converted by associated D/A converters 103Y, 103R-Y and 103B-Y into analog signals which are outputted at associated output terminals 104Y, 104R-Y and 10B-Y.

It is similarly possible with the camera control unit 100 of the present fourth embodiment to convert composite digital video signals composed of the digital luminance signal Y and the digital color difference signals R-Y and B-Y from the S/P conversion circuit 102 into composite digital video signals which are outputted.

To this end, the digital luminance signal Y and the digital color difference signals R-Y and B-Y from the S/P conversion circuit 102 are sent to a frequency conversion circuit 105. The frequency conversion circuit 105 directly outputs the digital luminance signal Y at the rate of 13.5 MHz, while outputting the digital color difference signals R-Y and B-Y after rate conversion to 6.75 MHz.

The signals outputted by the frequency conversion circuit 105 are sent to a P/S conversion circuit 106. The P/S conversion circuit 106 converts the signals supplied from the frequency conversion circuit 105 into serial digital signals which are outputted at an output terminal 107.

In the above-described fourth embodiment, the luminance signal Y and the color difference signals R-Y and B-Y are transmitted between the camera head 80 and the camera control unit 100. Since the signal rate is 27 MHz, high resolution may be realized. Of course, the signal transmission rate between the camera head 80 and the camera control unit 100 may be set to 36 MHz, as in the first embodiment described above. In such case, the frequency conversion circuit 88 of the camera head 80 may be eliminated. In addition, in the present fourth embodiment, the signal transmission rate from the camera head is set to 27 MHz which permits facilitated conversion by the camera control unit 100, thus simplifying the rate conversion by the camera control unit 100.

As a fifth embodiment, it is possible to reduce the amount of transmitted bits even in case the luminance signal Y and the color difference signals R-Y and B-Y are transmitted between the camera head 80 and the camera control unit 100.

That is, if 10 bits each of the luminance signal Y and the color difference signals R-Y and B-Y are transmitted between the camera head and the camera control unit at a sampling rate of 27 MHz, a transmission channel of at least 810 Mbits/sec is required. Therefore, if, with a view to high resolution, a system in which 10 bits of the luminance signals Y and 10 bits each of the digital color difference signals R-Y and B-Y are transmitted at a sampling rate of 27 MHz and at a sampling rate of 13.5 MHz, is used, a transmission channel of 540 Mbits/sec suffices for digital video signals in the signal transmission between the camera head and the camera control unit.

Figure 6:
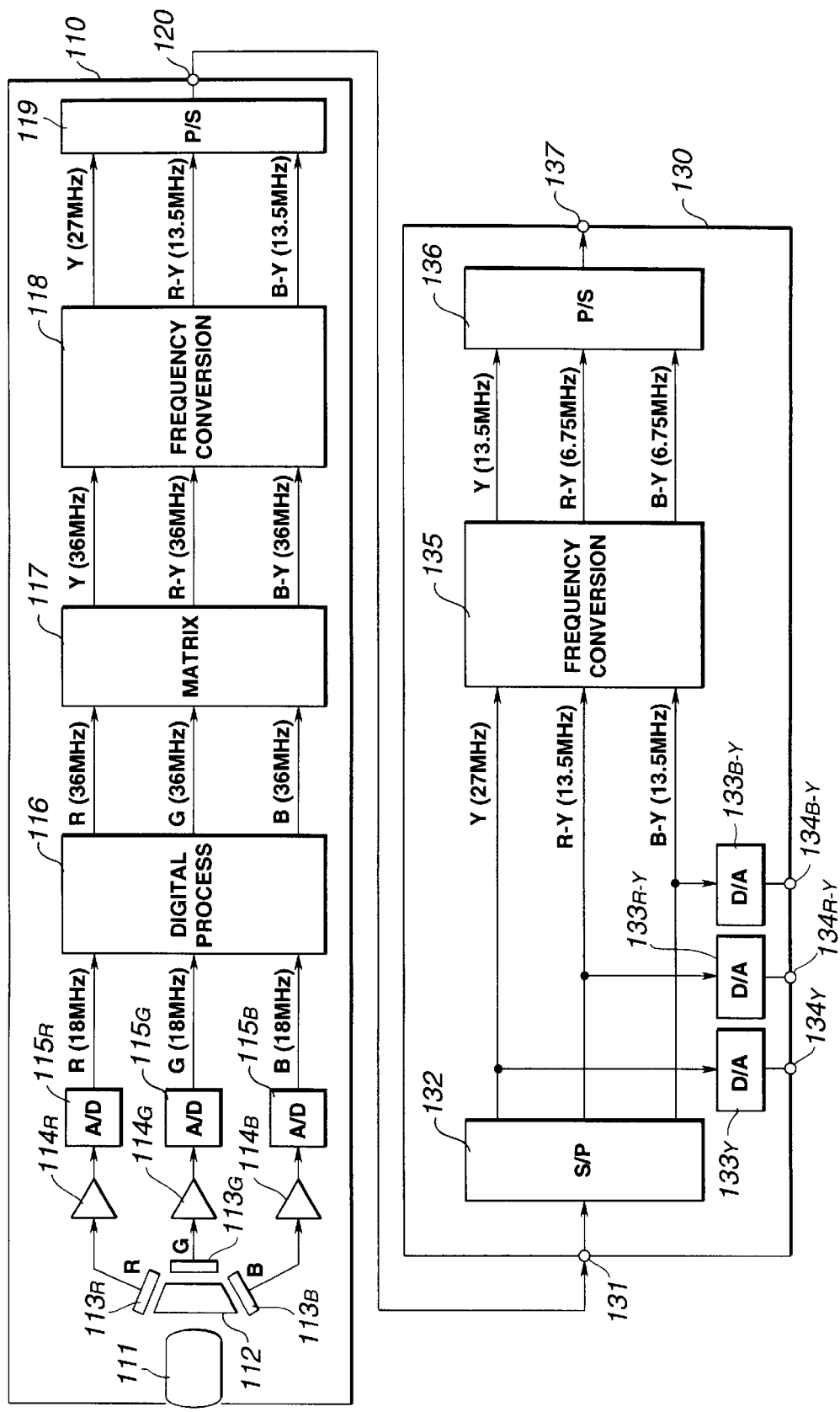
FIG. 6 is a block diagram showing a further embodiment of a transmission apparatus for digital color imaging signals according to the present invention.

FIG. 6 shows a fifth embodiment of the present invention. In FIG. 6, the structure from a lens system 111 of a camera head 110 to a digital processing circuit 116 is the same as that from the lens system 11 of the camera head 10 up to the digital processing circuit 16 of FIG. 2.

Referring to FIG. 6, the light from an object, incident on the lens system 111 of the camera head 110, is separated by a color-separating prism 112 into R, G and B beams, which are conducted towards a CCD 113R for R, a CCD 113G for G and a CCD 113B for B, respectively. These R, G and B beams are converted by the associated CCD 113R, CCD 113G and CCD 113B into imaging beams associated with R, G and B, respectively, and amplified by associated pre-amplifiers 114R, 114G and 114B so as to be supplied to A/D converters 115R, 115G and 115B, respectively. The imaging signals, converted into digital signals by the A/D converters 115R, 115G and 115B, are processed by a digital processing circuit 116. The frequency of the digital imaging signals, obtained on processing by the digital processing circuit 116, is twice the frequency of the input digital imaging signals (18 MHz), or 36 MHz.

The above-mentioned R, G and B component digital signals, obtained by the digital processing circuit 116, are sent to a matrix circuit 117. The matrix circuit 117 generates a digital luminance signal Y and digital color difference signals R-Y and B-Y from the above-mentioned R, G and B digital signals, and outputs the generated signals. The signal rates of the digital luminance signal Y and the digital signals color difference signals R-Y and B-Y are each 36 MHz.

The digital luminance signal Y and the digital signals color difference signals R-Y and B-Y, outputted from the matrix circuit 117, are sent to a frequency conversion circuit 118. This frequency conversion circuit 118 converts the signal rate of the luminance signal Y and that of the digital signals color difference signals R-Y and B-Y to 27 MHz and 13.5 MHz, respectively.

The signals converted in signal rate by the frequency conversion circuit 118 are sent to a P/S conversion circuit 119. The P/S conversion circuit 119 converts the digital luminance signal Y and the color difference signals R-Y and B-Y into serial digital signals which are outputted at an output terminal 120 along with various other sorts of the information. Although no particular reference is made to the format of the serial digital video signals outputted at the output terminal 120, compatibility in format is maintained between the camera head 110 and a camera control unit 130.

The serial digital video signals outputted at the output terminal 120 are sent via a cable or the like to an input terminal 131 of the camera control unit 130.

The serial digital video signals, supplied to the camera control unit 130, are converted by an S/P conversion circuit 132 into digital luminance signal Y and digital color difference signals R-Y and B-Y. Meanwhile, the signal rate of the digital luminance signals Y outputted by the S/P conversion circuit 132 is 27 MHz, while that of the digital color difference signals R-Y and B-Y is 13.5 MHz.

These digital luminance signal Y and the color difference signals R-Y and B-Y are converted by associated D/A converters 133Y, 133R-Y and 133B-Y into analog signals which are outputted at associated output terminals 134Y, 134R-Y and 134B-Y.

In the present fifth embodiment of the camera control unit 130, it is similarly possible to convert the component digital video signals, composed of the digital luminance signal Y and the digital color difference signals R-Y and B-Y from the S/P conversion circuit 132, into composite digital video signals, which are outputted.

That is, the digital luminance signal Y and the digital color difference signals R-Y and B-Y from the S/P conversion circuit 132 are sent to a frequency conversion circuit 135. This frequency conversion circuit 135 converts the rate of the digital luminance signal Y to 13.5 MHz, while converting that of the digital color difference signals R-Y and B-Y into 6.75 MHz, and outputs the resulting signals.

Output signals of the frequency conversion circuit 135 are sent to a P/S conversion circuit 136. The P/S conversion circuit 136 converts the signals supplied thereto from the frequency conversion circuit 135 into serial digital signals which are outputted at an output terminal 137.

In the above-described fifth embodiment, the transmission channel may be diminished because the luminance signal Y and the digital color difference signals R-Y and B-Y, transmitted from the camera head 110 to the camera control unit 130, are transmitted at a rate of 27 MHz and at a rate of 13.5 MHz, respectively. Since the luminance signal Y is transmitted at the rate of 27 MHz, high-resolution video signals can be produced. Since the rate of the luminance signal Y transmitted from the camera head 110 in the present fifth embodiment is set at 27 MHz that can be converted easily by the camera control unit 70, rate conversion by the camera control unit 130 is facilitated.

In the above-described third to fifth embodiments, the luminance signal Y with the transmission rate of 27 MHz, transmitted from the camera head to the camera control unit, may be one-channel luminance signal with a rate of 27 MHz, or two-channel luminance signal Y made up of 13.5 MHz luminance signal and 13.5 MHz high-resolution luminance signal.

A sixth embodiment of the present invention shows an embodiment in which a camera head is provided with a CCD which will give an aspect ratio of the viewing screen of 16:9. Meanwhile, the camera head of the sixth embodiment is designed so as to cope with the aspect ratio of 4:3 as well as the aspect ration of 16:9. Specifically, the camera head uses a CCD which will give the aspect ratio of the viewing screen of 16:9. For obtaining an image with the 4:3 aspect ratio, an image portion corresponding to the 4:3 aspect ratio is sliced from imaging signals obtained from the CCD for the aspect ratio of 16:9 and transmitted to the camera control unit. Since the horizontal ratio in this case is 4:3, it is desirable to use the transmission rate equal to ¾ of that for the aspect ratio of 16:9, that is the transmission rate equal to ¾ times 2 or 3/2 of the CCD sampling clocks.

Figure 7:
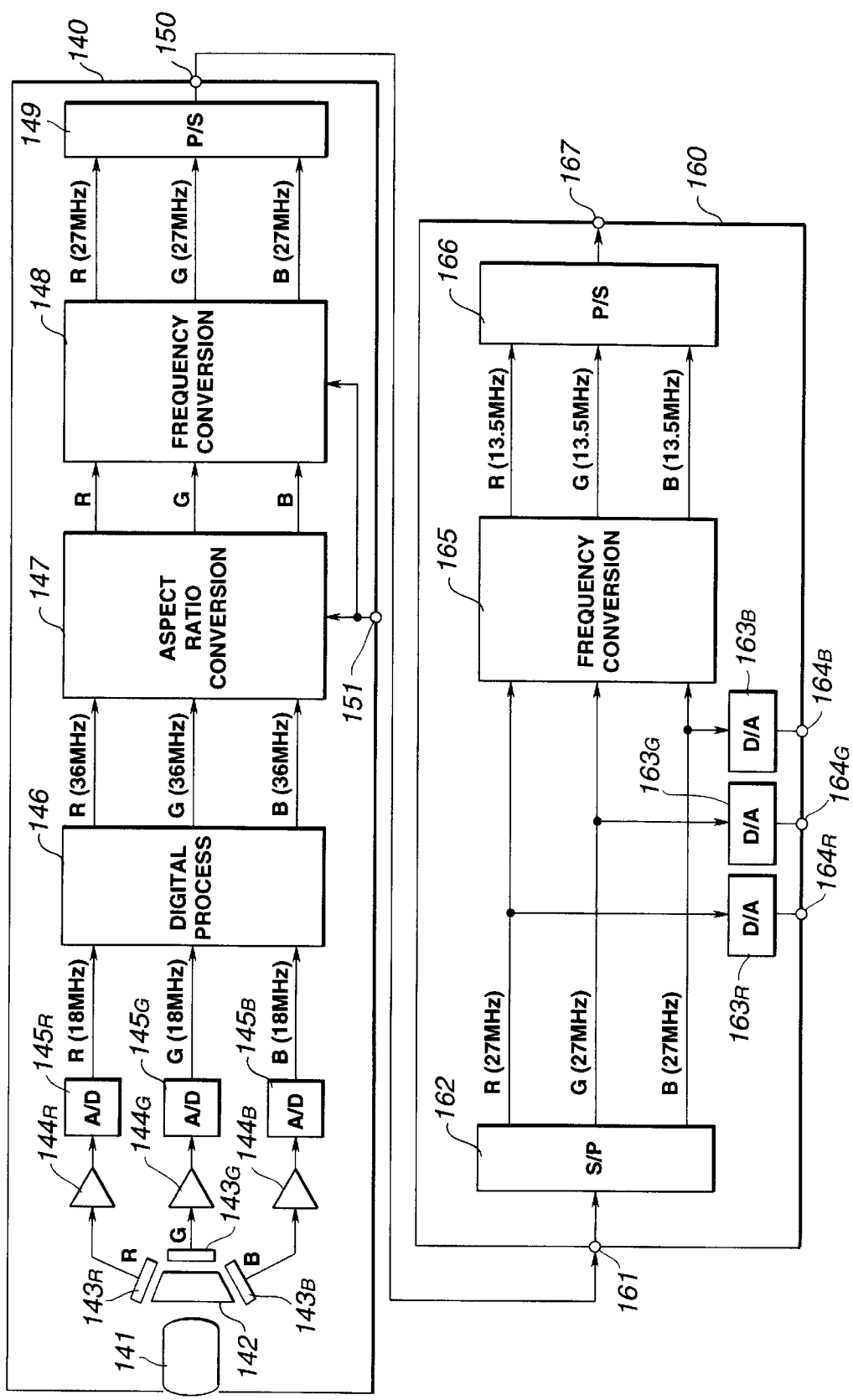
FIG. 7 is a block diagram showing yet another embodiment of a transmission apparatus for digital color imaging signals according to the present invention.

FIG. 7 shows a sixth embodiment for this case of the present invention.

Referring to FIG. 7, the light from an object, incident on the lens system 141 of the camera head 140, is separated by a color-separating prism 142 into R, G and B beams, which are conducted towards a CCD 143R for R, a CCD 143G for G and a CCD 143B for B, respectively. The CCDs 143R, 143G and 143B are associated with the aspect ratio of 16:9. These R, G and B beams, color-separated by the color-separating prism 142, are converted by the associated CCD 143R, CCD 143G and CCD 143B into imaging beams associated with R, G and B, respectively, and amplified by associated pre-amplifiers 144R, 144G and 144B so as to be supplied to A/D converters 145R, 145G and 145B, respectively. The imaging signals, converted into digital signals by the A/D converters 145R, 145G and 145B, are processed by a digital processing circuit 146. The frequency of the digital imaging signals, obtained on processing by the digital processing circuit 146, is twice the frequency of the input digital imaging signals (18 MHz), or 36 MHz.

The R, G and B component digital video signals, obtained by the digital processing circuit 146, are sent to an aspect ratio conversion circuit 147. If the imaging signals with the aspect ratio of 16:9 are transmitted to the camera control unit 160, the aspect ratio conversion circuit 147 directly outputs the R, G and B component digital video signals supplied by the digital processing circuit 146 without performing the aspect ratio converting operation. If the imaging signals with the aspect ratio of 4:3 are transmitted to the camera control unit 160, the aspect ratio conversion circuit 147 converts the R, G and B digital signals matched to the aspect ratio of 16:9 into digital signals matched to the aspect ratio of 4:3. That is, the aspect ratio conversion circuit 147 slices image portions corresponding to the aspect ratio of 4:3 from imaging signals obtained from the CCDs 143R, 143G and 143B for the aspect ratio of 16:9 by way of performing aspect ratio conversion. Meanwhile, if the aspect ratio conversion is not performed by the aspect ratio conversion circuit 147, the aspect ratio conversion circuit 147 outputs R, G and B digital signals with the rate of 36 MHz. If the aspect ratio conversion is performed by the aspect ratio conversion circuit 147, the aspect ratio conversion circuit 147 outputs R, G and B digital signals with the rate equal to ¾ times that for the aspect ratio of 16:9 or 27 MHz (equal to ¾ times 2 or 3⁄2 of the sampling clocks for the CCD of 18 MHz).

The R, G and B digital signals, outputted by the aspect ratio conversion circuit 147, are sent to a frequency conversion circuit 148. This frequency conversion circuit 148 converts the 36 MHz rate to 27 MHz if the aspect ratio conversion is not performed by the aspect ratio conversion circuit 147. If the aspect ratio conversion is done by the aspect ratio conversion circuit 147, the frequency conversion circuit 148 directly outputs the 27 MHz rate signal from the aspect ratio conversion circuit 147. Thus the frequency conversion circuit 148 outputs the 27 MHz rate R, G and B signals.

Meanwhile, switching between on/off of the aspect ratio conversion processing in the aspect ratio conversion circuit 147 and on/off of the frequency conversion processing in the frequency conversion circuit 148 occurs responsive to a switching control signal supplied via terminal 151. The switching control signal is generated responsive to the operation of a changeover switching provided on the camera head. Alternatively, the switching control signal may also be supplied from the camera control unit connected to the camera head.

The signals converted in signal rate by the frequency conversion circuit 148 are sent to a P/S conversion circuit 149. The P/S conversion circuit 149 converts the R, G and B component digital video signals into serial composite digital video signals which are outputted at an output terminal 150 along with various other sorts of the information. Although no particular reference is made to the format of the serial digital video signals outputted at the output terminal 150, compatibility in format is maintained between the camera head 140 and a camera control unit 160.

The composite digital video signals outputted at the output terminal 150 are sent via a cable or the like to an input terminal 161 of the camera control unit 160.

The composite digital video signals, supplied to the camera control unit 160, are converted by an S/P conversion circuit 162 into R, G and B component digital video signals. Meanwhile, the signal rate of the R, G and B component digital video signals outputted by the S/P conversion circuit 162 is 27 MHz.

The R, G and B component digital video signals from the S/P conversion circuit 162 are converted by D/A conversion circuits 163R, 163G and 163B provided in association with R, G and B, respectively, so as to be outputted at output terminals 164R, 164G and 164B associated with R, G and B, respectively.

If the R, G and B component digital video signals, for example, are outputted from the camera control unit 160, the R, G and B digital video signals from the S/P conversion circuit 162 are converted in signal transmission rate to 13.5 MHz by the frequency conversion circuit 165 to 13.5 MHz before being sent to a P/S conversion circuit 166. The digital video signals, thus converted by the P/S conversion circuit 166, are outputted at an output terminal 167.

In the above-described sixth embodiment, since aspect ratio conversion is feasible, and the sampling rate of the digital video signals transmitted from the camera head 140 to the camera control unit 160 is 27 MHz, output signals from output terminals 164R, 164G and 164B of the camera control unit 160, are of a limit resolution exceeding 1000. In addition, since the digital video signals of a rate which permits facilitated conversion by the camera control unit 160 are outputted from the camera head 140, rate conversion by the camera control unit 40 is facilitated.

If, in the above-described sixth embodiment, the luminance signals Y are generated and transmitted from the camera head to the camera control unit, as in the above-described third embodiment, the transmission channel may be reduced. In this case, in the camera head 140 of FIG. 7, a configuration substantially similar to an arrangement from the matrix circuit 57 of the camera head 50 to the P/S conversion circuit 59 of FIG. 4 is substituted for an arrangement downstream of the aspect ratio conversion circuit 147, while a configuration substantially similar to the camera control unit 70 is substituted for the camera control unit 160 of FIG. 7. The fourth or fifth embodiments may also be substituted for the arrangement shown in FIG. 7. That is, if the above-described fourth embodiment is applied to the configuration of FIG. 7, the configuration substantially similar to the arrangement from the matrix circuit 87 of the camera head 80 to the P/S conversion circuit 89 is substituted for the arrangement downstream of the aspect ratio conversion circuit 147 while the configuration substantially similar to the camera control unit 100 of FIG. 5 is substituted for the camera control unit 160 of FIG. 7. If the above-described fifth embodiment is applied to the configuration of FIG. 7, the configuration substantially similar to the arrangement from the matrix circuit 117 of the camera head 110 to the P/S conversion circuit 119 is substituted for the arrangement downstream of the aspect ratio conversion circuit 147 while the configuration substantially similar to the camera control unit 130 of FIG. 6 is substituted for the camera control unit 160 of FIG. 7.

In the above-described embodiments of the present invention, an image exploiting the pixel-offsetting effect, that is high-resolution image, can be obtained from the camera control unit. In addition, the above effect may be produced while preventing the transmission band from being increased. Moreover, circuit interchangeability may be facilitated between the case not in need of high-resolution output and the case in need of the high-resolution output.

By setting the sampling rate of at least one of plural signal components constituting the digital color image signals obtained on imaging with a CCD imaging device so as to be higher than the sampling frequency of the CCD imaging device, the digital color imaging signals generated on the camera side can be transmitted to the camera control unit without detracting from the resolution of the digital color video signals generated by the camera unit thus enabling the camera control unit to output high-resolution imaging signals.

What is claimed is:

1. A method for generating and transmitting digital color imaging signals formed at a pre-set sampling rate from an output of a camera device to a camera controlling unit, comprising the steps of:

processing the digital color imaging signals, said processing resulting in at least one of plural signal components making up the digital color imaging signals to have a component sampling rate higher than said pre-set sampling rate;

converting at least one of the plural signal components making up the digital color imaging signals so that a converted output sampling rate of the at least one of the plural signal components at said output is between said pre-set sampling rate and said component sampling rate;

converting said digital color imaging signals containing said at least one of the plural signal components having the converted output sampling rate into serial color imaging signals; and transmitting from the output of said camera device to said camera controlling unit the serial color imaging signals containing said at least one of the plural signal components having the converted output sampling rate.

2. The method for transmitting digital color imaging signals as claimed in claim 1, wherein said at least one of the plural signal components is a luminance component of said digital color imaging signals.

3. The method for transmitting digital color imaging signals as claimed in claim 1, wherein the component sampling rate of said at least one of plural signal components is twice the pre-set sampling rate.

4. The method for transmitting digital color imaging signals as claimed in claim 1, wherein the converted output sampling rate of said at least one of the plural signal components is 3/2 times the pre-set sampling rate.

5. The method for transmitting digital color imaging signals as claimed in claim 1, wherein the converted output sampling rate of said at least one of the plural signal components is an integer number multiple of a transmission sampling rate.

6. The method for transmitting digital color imaging signals as claimed in claim 1, wherein an output sampling rate of signal components other than said at least one of the plural signal components is not higher than the pre-set sampling rate.

7. An apparatus for generating and transmitting digital color imaging signals formed at a pre-set sampling rate from an output of a camera device to a camera controlling unit, comprising:

means for processing the digital color imaging signals, said processing resulting in at least one of plural signal components making up the digital color imaging signals to have a component sampling rate higher than said pre-set sampling rate;

means for converting at least one of the plural signal components making up the digital color imaging signals so as to obtain a converted output sampling rate at said output between said pre-set sampling rate and said component sampling rate;

parallel/serial conversion means for converting said digital color imaging signals containing said at least one of the plural signal components having the converted output sampling rate into serial color imaging signals;

means for transmitting from the output of said camera device said serial color imaging signals to said camera controlling unit;

serial/parallel conversion means provided within said camera controlling unit for receiving the transmitted serial digital color imaging signals for converting the transmitted serial digital color imaging signals into parallel digital color imaging signals; and digital/analog converting means for converting the parallel digital color imaging signals converted by said serial/parallel conversion means into analog color imaging signals.

8. The apparatus for transmitting digital color imaging signals as claimed in claim 7, wherein said at least one of plural signal components is a luminance component of said digital color imaging signals.

9. The apparatus for transmitting digital color imaging signals as claimed in claim 7, wherein the component sampling rate of said at least one of plural signal components is twice the pre-set sampling rate.

10. The apparatus for transmitting digital color imaging signals as claimed in claim 7, wherein the converted output sampling rate of said at least one of the plural signal components is equal to 3/2 times the pre-set sampling rate.

11. The apparatus for transmitting digital color imaging signals as claimed in claim 7, wherein the converted output sampling rate of said at least one of the plural signal components is an integer number multiple of a transmission sampling rate.

12. The apparatus for transmitting digital color imaging signals as claimed in claim 7, wherein an output sampling rate of signal components other than said at least one of the plural signal components is not higher than the pre-set sampling rate.

13. An apparatus for generating and transmitting digital color imaging signals formed at a pre-set sampling rate from an output of a camera device to a camera controlling unit, said camera device comprising:

means for processing the digital color imaging signals, said processing resulting in at least one of plural signal components making up the digital color imaging signals to have a component sampling rate higher than said pre-set sampling rate;

means for converting at least one of the plural signal components making up the digital color imaging signals so as to obtain a converted output sampling rate at said output between said pre-set sampling rate and said component sampling rate;

parallel/serial conversion means for converting said digital color imaging signals containing said at least one of the plural signal components having the converted output sampling rate into serial color imaging signals;

means for transmitting from the output of said camera device said serial color imaging signals to said camera controlling unit;

said camera controlling unit comprising:

serial/parallel conversion means provided within said camera controlling unit for receiving the transmitted serial digital color imaging signals and for converting the transmitted serial digital color imaging signals into parallel digital color imaging signals; and digital/analog converting means for converting the parallel digital color imaging signals converted by said serial/parallel conversion means into analog color imaging signals.

14. The apparatus as claimed in claim 13, wherein said means for transmitting transmits said serial color imaging signals at the converted output sampling rate formed by said means for converting.

15. The apparatus as claimed in claim 14, wherein said means for converting includes a digital processor which processes the digital color imaging signals in accordance with SMPTE standards.

16. The apparatus as claimed in claim 13, wherein said camera device further comprises means for generating in addition to said digital color imaging signals a high-resolution luminance signal.

17. The apparatus as claimed in claim 16, wherein said means for generating generates color difference signals as said digital color imaging signals.

18. The apparatus as claimed in claim 17, wherein said camera device further comprises means for selectively controlling a number of bits according to a type of the digital color imaging signals to reduce a total amount of bits transmitted by said transmitting means.

19. The apparatus as claimed in claim 13, wherein said camera device further comprises means for converting an aspect ratio of a picture represented by said digital color imaging signals by selectively setting an output sampling rate of the digital color imaging signals to be transmitted in accordance with the aspect ratio.

* * * * *